(12) United States Patent
Gerson et al.

(10) Patent No.: US 9,897,801 B2
(45) Date of Patent: Feb. 20, 2018

(54) MULTI-HINGE MIRROR ASSEMBLY

(71) Applicant: APPLE INC., Cupertino, CA (US)

(72) Inventors: Yuval Gerson, Sunnyvale, CA (US); Alexander Shpunt, Portola Valley, CA (US)

(73) Assignee: APPLE INC., Cupertino, CA (US)

( * ) Notice: Subject to any disclaimer, the term of this patent is extended or adjusted under 35 U.S.C. 154(b) by 259 days.

(21) Appl. No.: 14/941,599

(22) Filed: Nov. 15, 2015

(65) Prior Publication Data

US 2017/0090186 A1 Mar. 30, 2017

Related U.S. Application Data

(60) Provisional application No. 62/234,688, filed on Sep. 30, 2015.

(51) Int. Cl.
*G02B 26/08* (2006.01)
*G02B 26/10* (2006.01)

(52) U.S. Cl.
CPC ....... *G02B 26/105* (2013.01); *G02B 26/0833* (2013.01)

(58) Field of Classification Search
CPC ............... G02B 26/08; G02B 26/0816; G02B 26/0825; G02B 26/0833; G02B 26/0841; G02B 26/105; G02B 26/101; G02B 7/1821; G02B 26/10; G02B 26/001; G02B 26/0808; G02B 26/02; H04N 9/3129
USPC ..................... 359/199.1–199.4, 201.2–214.1, 359/223.1–226.1, 291
See application file for complete search history.

(56) References Cited

U.S. PATENT DOCUMENTS

| | | | |
|---|---|---|---|
| 3,918,068 A | 11/1975 | Reinke et al. | |
| 4,003,626 A | 1/1977 | Reinke et al. | |
| 5,608,468 A * | 3/1997 | Gove | H04N 5/7458 348/770 |
| 5,629,790 A | 5/1997 | Neukermans et al. | |
| 5,742,419 A | 4/1998 | Dickensheets et al. | |

(Continued)

FOREIGN PATENT DOCUMENTS

| CN | 1621322 | 6/2005 |
|---|---|---|
| CN | 101308343 A | 11/2008 |

(Continued)

OTHER PUBLICATIONS

CN Application # 201380015506.3 Office Action dated Aug. 16, 2016.

(Continued)

*Primary Examiner* — Bumsuk Won
*Assistant Examiner* — Henry Duong
(74) *Attorney, Agent, or Firm* — D. Kligler IP Services Ltd.

(57) ABSTRACT

A scanning device includes a substrate, which is etched to define a recess in the substrate and to define the following structures contained in the recess: At least first and second mirrors are disposed along a common axis of rotation. Torsion hinges extend collinearly along the axis of rotation and connect the first and second mirrors to the substrate so that the first and second mirrors rotate on the torsion hinges about the axis of rotation. Rigid struts are disposed alongside the axis of rotation and connect the first mirror to the second mirror so that the struts rotate about the axis of rotation together with the first and second mirrors.

14 Claims, 3 Drawing Sheets

(56) References Cited

U.S. PATENT DOCUMENTS

| | | |
|---|---|---|
| 5,847,859 A | 12/1998 | Murata |
| 5,938,989 A | 8/1999 | Hambright |
| 6,140,979 A | 10/2000 | Gerhard et al. |
| 6,517,751 B1 | 2/2003 | Hambright |
| 6,540,361 B1 | 4/2003 | Hayashi et al. |
| 6,603,894 B1 | 8/2003 | Pu |
| 6,753,638 B2 | 6/2004 | Adams et al. |
| 6,825,967 B1 | 11/2004 | Chong et al. |
| 6,882,770 B2 | 4/2005 | Neilson et al. |
| 6,941,034 B2 | 9/2005 | Kuboi |
| 7,609,875 B2 | 10/2009 | Liu et al. |
| 7,952,781 B2 | 5/2011 | Weiss et al. |
| 8,018,579 B1 | 9/2011 | Krah |
| 8,437,063 B2 | 5/2013 | Weiss et al. |
| 8,624,177 B2 | 1/2014 | Campion et al. |
| 8,752,969 B1 | 6/2014 | Kane et al. |
| 8,797,623 B2 | 8/2014 | Weiss et al. |
| 9,462,255 B1 | 10/2016 | Marason et al. |
| 2002/0070335 A1 | 6/2002 | Orcrutt et al. |
| 2002/0071169 A1 | 6/2002 | Bowers et al. |
| 2002/0075786 A1 | 6/2002 | Ikegame et al. |
| 2003/0137711 A1 | 7/2003 | Yagi et al. |
| 2003/0162313 A1 | 8/2003 | Kim et al. |
| 2004/0004775 A1 | 1/2004 | Turner |
| 2004/0021852 A1 | 2/2004 | Deflumere |
| 2004/0040648 A1 | 3/2004 | Harden et al. |
| 2004/0063235 A1 | 4/2004 | Chang |
| 2004/0070816 A1 | 4/2004 | Kato et al. |
| 2004/0081391 A1 | 4/2004 | Ko et al. |
| 2004/0105139 A1 | 6/2004 | Hirose et al. |
| 2004/0207744 A1 | 10/2004 | Bock |
| 2004/0214350 A1 | 10/2004 | Pan et al. |
| 2007/0064293 A1 | 3/2007 | Turner et al. |
| 2008/0143196 A1 | 6/2008 | Sprague et al. |
| 2008/0225368 A1 | 9/2008 | Ciabattoni et al. |
| 2009/0002678 A1 | 1/2009 | Tanaka et al. |
| 2009/0161177 A1 | 6/2009 | Nomura |
| 2009/0284817 A1 | 11/2009 | Orcutt |
| 2009/0294638 A1 | 12/2009 | Mohanty et al. |
| 2010/0046054 A1 | 2/2010 | Jeong et al. |
| 2010/0142020 A1 | 6/2010 | Kim |
| 2010/0182667 A1 | 7/2010 | Ishida |
| 2010/0253989 A1 | 10/2010 | Shimizu et al. |
| 2010/0302617 A1 | 12/2010 | Zhou |
| 2011/0188054 A1 | 8/2011 | Petronius et al. |
| 2011/0205609 A1 | 8/2011 | Mizoguchi |
| 2011/0228251 A1 | 9/2011 | Yee et al. |
| 2011/0228367 A1 | 9/2011 | Lubianiker et al. |
| 2011/0279648 A1 | 11/2011 | Lutian et al. |
| 2011/0310125 A1 | 12/2011 | McEldowney et al. |
| 2012/0236379 A1 | 9/2012 | Dasilva et al. |
| 2012/0250124 A1 | 10/2012 | Choi et al. |
| 2012/0307211 A1 | 12/2012 | Hofmann et al. |
| 2013/0206967 A1 | 8/2013 | Shpunt et al. |
| 2013/0207970 A1 | 8/2013 | Shpunt et al. |
| 2013/0301101 A1 | 11/2013 | Conrad et al. |
| 2014/0078514 A1 | 3/2014 | Zhu |
| 2014/0153001 A1 | 6/2014 | Chayat et al. |
| 2014/0226145 A1 | 8/2014 | Steffey et al. |
| 2014/0291491 A1 | 10/2014 | Shpunt et al. |
| 2014/0291496 A1 | 10/2014 | Shpunt et al. |
| 2014/0310914 A1 | 10/2014 | Erlich et al. |
| 2014/0313519 A1 | 10/2014 | Shpunt et al. |
| 2015/0234179 A1 | 8/2015 | Shpunt |
| 2016/0178895 A1 | 6/2016 | Gerson et al. |

FOREIGN PATENT DOCUMENTS

| | | |
|---|---|---|
| DE | 102011113147 B3 | 1/2013 |
| EP | 1548487 A1 | 6/2005 |
| EP | 2333603 A1 | 6/2011 |
| EP | 2363686 A1 | 9/2011 |
| GB | 2271436 A | 4/1994 |
| JP | 2004191918 A | 7/2004 |
| KR | 100867147 B1 | 11/2008 |
| WO | 2002047241 A1 | 6/2002 |
| WO | 03/049156 A2 | 6/2003 |
| WO | 2005078509 A2 | 8/2005 |
| WO | 2012/020380 A1 | 2/2012 |
| WO | 2012013536 A1 | 2/2012 |
| WO | 2014016794 A1 | 1/2014 |
| WO | 2014064606 A1 | 5/2014 |

OTHER PUBLICATIONS

U.S. Appl. No. 14/599,507 Office Action dated Oct. 20, 2016.
U.S. Appl. No. 14/551,104 Office Action dated Nov. 1, 2016.
International Application # PCT/US2016/45452 Search Report dated Oct. 28, 2016.
Sandner et al., "Synchronized microscanner array for large aperture receiver optics of LIDAR systems", Proceedings of SPIE—the International Society for Optical Engineering, vol. 7594, 12 pages, Feb. 17, 2010.
U.S. Appl. No. 14/975,871 Office Action dated Jan. 13, 2017.
U.S. Appl. No. 14/599,507 Office Action dated Mar. 8, 2017.
U.S. Appl. No. 14/554,086 Office Action dated Mar. 10, 2017.
U.S. Appl. No. 14/554,078 Office Action dated May 31, 2017.
Judy et al., "Magnetic Microactuation of Polysilicon Flexure Structures," Solid-State Sensor and Actuator Workshop, 1994.
Judy et al., "Magnetically Actuated, Addressable Microstructures," Journal of Microelectromechanical Systems, vol. 6, No. 3, pp. 249-256, Sep. 1997.
Cho et al., "A Scanning Micromirror Using a Bi-Directionally Movable Magnetic Microactuator," Proceedings of SPIE, MOEMS and Miniaturized Systems, vol. 4178, pp. 106-115, USA 2000.
Hamamatsu Photonics K.K., "Position sensitive detectors", Japan, Feb. 2010.
Gale, M.T., "Replication Technology for Diffractive Optical Elements", Proceedings of SPIE, vol. 3010, pp. 111-123, May 15, 1997.
Kolste et al., "Injection Molding for Diffractive Optics", Proceedings of SPIE, vol. 2404, pp. 129-131, Feb. 9, 1995.
Gale et al., "Replicated Microstructures for Integrated Topics", Proceedings of SPIE, vol. 2513, pp. 2-10, Aug. 29, 1994.
Jahns et al., "Diffractive Optics and Micro-Optics: Introduction to the Feature Issue", Applied Optics Journal, vol. 36, No. 20, pp. 4633-4634, Jul. 10, 1997.
Nikolejeff et al., "Replication of Continuous Relief Diffractive Optical Elements by Conventional Compact Disc Injection-Molding Techniques", Applied Optics Journal, vol. 36, No. 20, pp. 4655-4659, Jul. 10, 1997.
Neyer et al., "New Fabrication Technology for Polymer Optical Waveguides", Integrated Photonics Research, pp. 248-249, 1992.
Neyer et al., "Fabrication of Low Loss Polymer Waveguides Using Injection Moulding Technology", Electronics Letters, vol. 29, No. 4, pp. 399-401, Feb. 18, 1993.
Optical Society of America, "Diffractive Optics and Micro-Optics", 1996 Technical Digest Series, vol. 5, Boston, USA, Apr. 29-May 2, 1996.
Lintec Corporation, "Adwill D-510T Tape", Japan, Apr. 4, 2006.
Stark, B., "MEMS Reliability Assurance Guidelines for Space Applications", Jet Propulsion Laboratory, California Institute of Technology, Pasadena, USA, Jan. 1999.
Fraunhofer Institute for Photonic Microsystems, "Lamda—Large Aperture MEMS Scanner Module for 3D Distance Measurement"—Data sheet, Dresden, Germany, 2 pages, May 9, 2012.
International Application # PCT/IB2013/056101 Search Report dated Dec. 17, 2013.
Fujita et al., "Dual-Axis MEMS Mirror for Large Deflection-Angle Using SU-8 Soft Torsion Beam," Sensors and Actuators A: Physical, vol. 121, issue 1, pp. 16-21, May 2005.
Stone et al., "Performance Analysis of Next-Generation LADAR for Manufacturing, Construction, and Mobility", National Institute of Standards and Technology, document # NISTIR 7117, Gaithersburg, USA, May 2004.
U.S. Appl. No. 13/798,251 Office Action dated Nov. 20, 2014.
International Application PCT/IB2013/051985 Search Report dated Jul. 22, 2013.

(56) References Cited

OTHER PUBLICATIONS

International Application PCT/IB2013/051189 Search Report dated Jun. 18, 2013.
Minifaros, "D1.1—ProjectPresentation", V3.0, 36 pages, Dec. 22, 2010.
Sandenr et al., "Large Aperture MEMS Segmented Scanner Module for LIDAR Systems", SPAR Conference—Europe, Amsterdam, 48 pages, Dec. 8, 2010.
Gerson et al., U.S. Appl. No. 14/599,507, filed Nov. 18, 2014.
Shpunt et al., U.S. Appl. No. 14/554,086, filed Nov. 26, 2014.
Shpunt et al., U.S. Appl. No. 14/554,078, filed Nov. 26, 2014.
Niclass et al., "Design and characterization of a 256x64-pixel single-photon imager in CMOS for a MEMS based laser scanning time-of-flight sensor", Optics Express, vol. 20, No. 11, pp. 11863-11881, May 21, 2012.
Hah et al., "Theory and Experiments of Angular Vertical Comb-Drive Actuators for Scanning Micromirrors", IEEE Journal of Selected Topics in Quantum Electronics, vol. 10, No. 3, pp. 505-513, May/Jun. 2004.
International Application # PCT/US15/56297 Search Report dated Jan. 19, 2016.
Sandner et al., "3D imaging using resonant large-aperture MEMS mirror arrays and laser distance measurement", Optical MEMs and Nanophotonics, IEEE/LEOS International Conference, pp. 78-79, Aug. 11, 2008.
CN Application # 201380015506.3 Office Action dated Mar. 31, 2016.
Shpunt et al, U.S. Appl. No. 14/975,871, filed Dec. 21, 2015.
Shpunt et al., U.S. Appl. No. 14/551,104, filed Nov. 24, 2014.
Erlich et al., U.S. Appl. No. 14/622,942, filed Feb. 16, 2015.
Yang et al., "Phase synchronization of micro-mirror arrays using elastic linkages", Sensors and Actuators A, Elsevier Sequoia, vol. 95, No. 1, pp. 55-60, Dec. 15, 2001.
Gruger et al., "New approach for MEMS scanning mirror for laser projection systems", SPIE Proceedings, vol. 6887, MOEMS and Miniaturized Systems VII, pp. 68870L-68870L, Feb. 8, 2008.
International Application # PCT/US2015/67974 Search Report dated May 3, 2016.
International Application # PCT/US2017/039165 Search Report dated Oct. 4, 2017.

\* cited by examiner

MULTI-HINGE MIRROR ASSEMBLY

CROSS-REFERENCE TO RELATED APPLICATION

This application claims the benefit of U.S. Provisional Patent Application 62/234,688, filed Sep. 30, 2015, which is incorporated herein by reference.

FIELD OF THE INVENTION

The present invention relates generally to micro-mechanical systems, and particularly to optical scanning using such systems.

BACKGROUND

Microelectromechanical system (MEMS) technologies have been used to produce various sorts of scanning devices, and particularly miniature scanning mirrors. For example, U.S. Pat. No. 7,952,781, whose disclosure is incorporated herein by reference, describes a method of scanning a light beam and a method of manufacturing a microelectromechanical system (MEMS), which can be incorporated in a scanning device. Other methods for fabrication of MEMS scanning devices are described in PCT International Publication WO 2014/064606, whose disclosure is incorporated herein by reference, as well.

MEMS technologies have also been used to produce arrays of scanning mirrors. For example, the Lamda scanner module, produced by the Fraunhofer Institute for Photonic Microsystems IPMS (Dresden, Germany), is constructed based on a segmented MEMS scanner device consisting of identical scanning mirror elements. A single scanning mirror of the collimated transmit beam oscillates parallel to a segmented scanning mirror device of the receiver optics.

As another example, PCT International Publication WO 2013/140307, whose disclosure is incorporated herein by reference, describes a gimbaled scanning mirror array. As described in this publication, a scanning device includes a substrate, which is etched to define an array of two or more parallel micromirrors and a support surrounding the micromirrors. Respective spindles connect the micromirrors to the support, thereby defining respective parallel axes of rotation of the micromirrors relative to the support. One or more flexible coupling members are connected to the micromirrors so as to synchronize an oscillation of the micromirrors about the respective axes.

In a similar vein, Yang et al. describe a multi-mirror MEMS device in "Phase Synchronization of Micro-Mirror Arrays Using Elastic Linkages," Sensors and Actuators A95 (2001), pages 55-60. This device is intended to replace a conventional large-area mirror, thus increasing the working frequency and inducing smaller vibration amplitude.

SUMMARY

Embodiments of the present invention that are described hereinbelow provide improved multi-element synchronized scanners.

There is therefore provided, in accordance with an embodiment of the invention, a scanning device, including a substrate, which is etched to define a recess in the substrate and to define the following structures contained in the recess: At least first and second mirrors are disposed along a common axis of rotation. First and second torsion hinges extend along the axis of rotation and connect the first mirror to the substrate on opposing sides of the first mirror so that the first mirror rotates on the first and second torsion hinges about the axis of rotation. Third and fourth torsion hinges extend along the axis of rotation collinearly with the first and second hinges and connect the second mirror to the substrate on opposing sides of the second mirror so that the second mirror rotates on the third and fourth torsion hinges about the axis of rotation. Rigid struts are disposed alongside the axis of rotation and connect the first mirror to the second mirror so that the struts rotate about the axis of rotation together with the first and second mirrors.

In a disclosed embodiment, the structures include an anchor, which is fixed to the substrate at a location between the first and second mirrors, wherein the second and third torsion hinges connect the first and second mirrors, respectively, to the anchor.

Typically, the struts are sufficiently stiff to synchronize an angle of rotation of the first and second mirrors.

In a disclosed embodiment, the at least first and second mirrors include a third mirror, and the substrate is further etched to define fifth and sixth torsion hinges, which extend along the axis of rotation and connect the third mirror to the substrate on opposing sides of the third mirror, and further rigid struts, which are disposed alongside the axis of rotation and connect the third mirror to the second mirror, so that the third mirror and the further struts rotate about the axis of rotation together with the first and second mirrors.

In some embodiments, the substrate includes one or more semiconductor wafers. In one embodiment, the substrate includes at least first and second semiconductor wafers, which are bonded together, wherein the first and second semiconductor wafers are etched before bonding to define internal cavities within at least the first mirror. Typically, the mirrors have respective surface areas of at least 20 mm$^2$ and respective thicknesses no greater than 0.5 mm.

There is also provided, in accordance with an embodiment of the invention, a method for producing a scanning device, which includes etching a substrate to define a recess in the substrate and to define the structures described above, contained in the recess.

The present invention will be more fully understood from the following detailed description of the embodiments thereof, taken together with the drawings in which:

DETAILED DESCRIPTION OF EMBODIMENTS

When large mirrors (for example, a centimeter or more on a side) are to be produced by MEMS processes, it becomes difficult to make the mirrors stiff enough to avoid internal vibrational modes. The internal vibrations lead to loss of optical quality and precision in the reflected beams.

Embodiments of the present invention addresses this problem by effectively breaking the large mirror into an array of multiple smaller mirrors, which are separately hinged but are coupled together by rigid struts in order to ensure precise synchronization. Surprisingly, the resulting combined mirror, with multiple sets of hinges and struts, has been found to eliminate the troublesome internal modes of vibration. The struts are "rigid" in the sense that they do not significantly deform as the mirrors rotate, and are thus sufficiently stiff to synchronize the angle of rotation of the mirrors to within a specified tolerance, for example, no more than 1° of angular difference between the mirrors.

In the disclosed embodiments, a scanning device is produced by etching a substrate to create a recess in the substrate and to define an array of mirrors and supporting structures, contained within the recess. The mirrors are disposed along a common axis of rotation, and rotate about the axis on respective pairs of torsion hinges, which connect the mirrors to the substrate. The hinges on at least one side of each of the mirrors typically connect to the substrate via an anchor within the recess, wherein the anchor is fixed to the substrate at a location between the mirrors.

The mirrors are connected to one another by rigid struts, which are disposed alongside the axis of rotation and thus rotate about the axis of rotation together with the mirrors. These struts maintain the desired angular synchronization between the mirrors, while the arrangement of hinges and struts inhibits the development of undesirable vibrational modes, including modes of longitudinal vibration. Another advantage of this sort of array, relative to a single large mirror of similar overall dimensions, is that the mirrors have lower inertia and thus require less drive power to maintain a given angular range and frequency.

Figure 1:
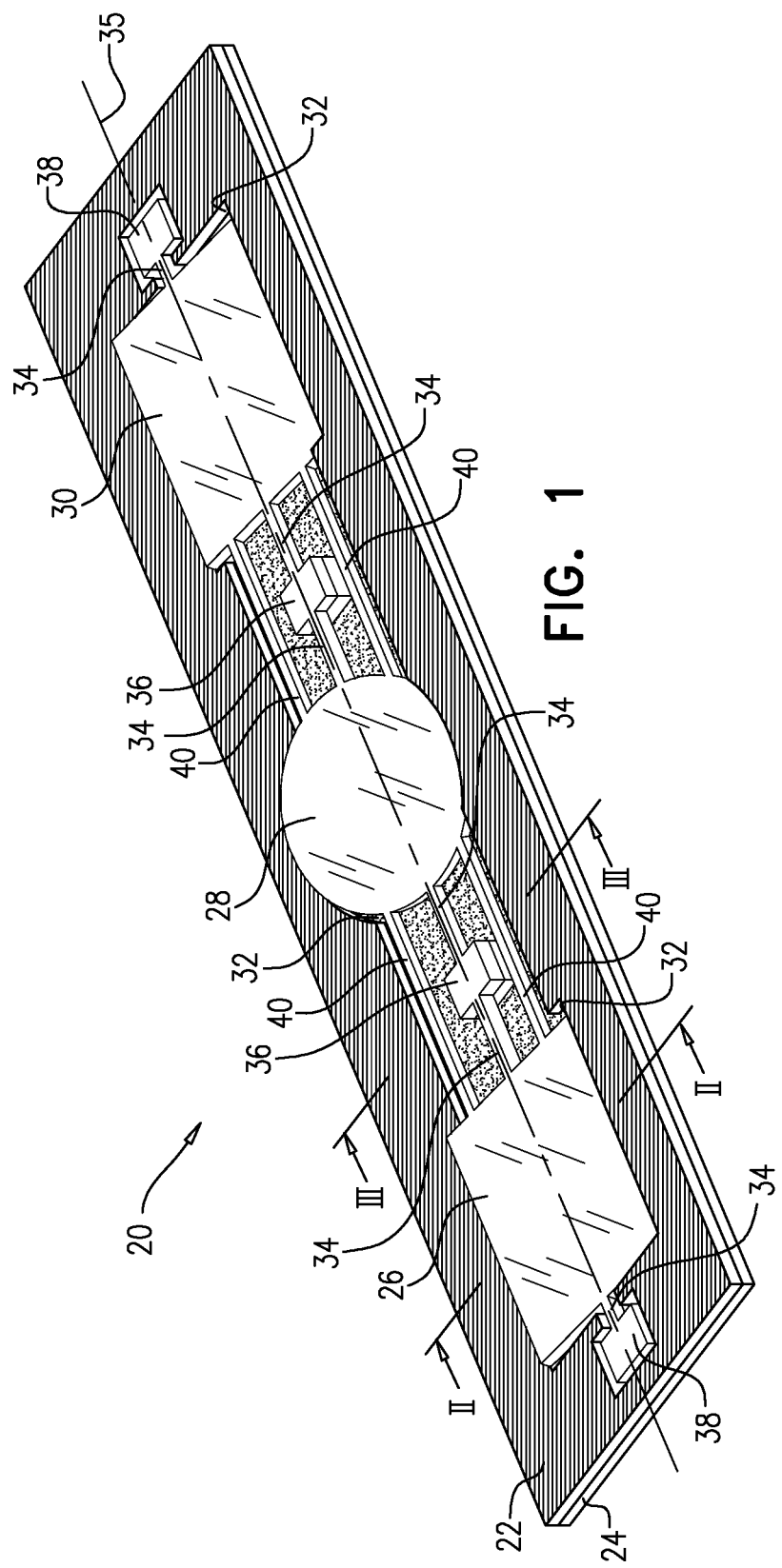
FIG. 1 is schematic, pictorial illustration of a scanning multi-mirror array, in accordance with an embodiment of the invention.
Figure 2:
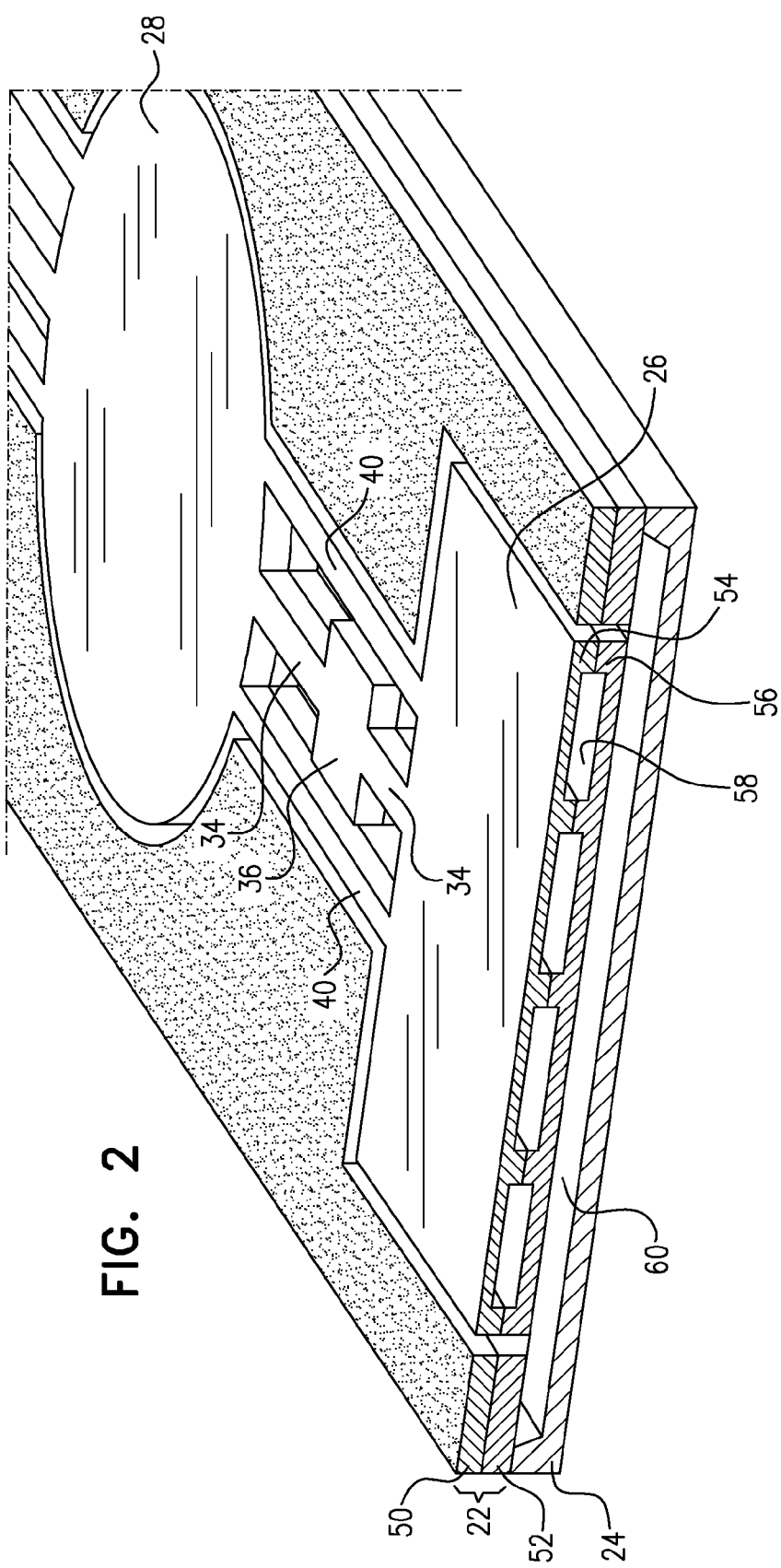
FIG. 2 is a schematic detail view of the array of FIG. 1.
Figure 3:
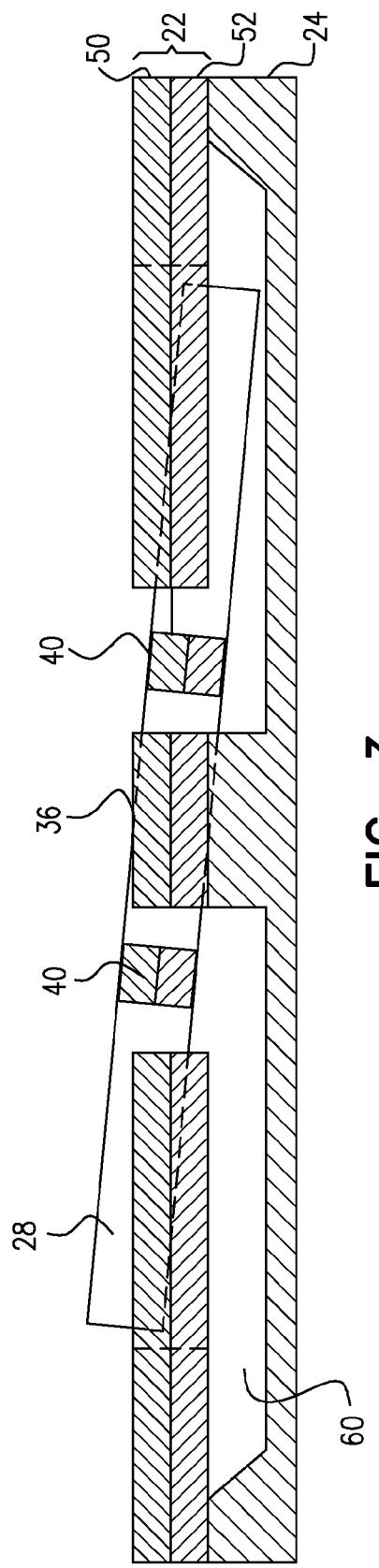
FIG. 3 is a schematic sectional view of the array of FIG. 1.

Reference is now made to FIGS. 1-3, which schematically illustrate a scanning multi-mirror array 20, in accordance with an embodiment of the invention. FIG. 1 presents a pictorial overview of the array, while FIGS. 2 and 3 show details in sectional views, taken respectively along the lines II-II and III-III in FIG. 1.

Array 20 comprises a substrate 22, which comprises at least one semiconductor wafer, such as a silicon wafer, or in the present example, two such wafers 50 and 52, which are separately etched and then bonded together. For mechanical strength and stability, substrate 22 is mounted on a base 24, which may similarly comprise one or more semiconductor wafers, suitably etched and cut, or another suitable material, such as a rigid metal or plastic piece. Although base 24 is shown in the figures as a solid sheet, the base may alternatively be open in the center and comprise only a peripheral frame with transverse supports where required.

Substrate 22 is etched to define mirrors 26, 28 and 30, which are contained in a central recess 32 in the substrate. Typically, a reflective coating, such as a suitable metal layer, is deposited over the semiconductor material in the area of the mirrors. Depending on application requirements, each of mirrors 26, 28 and 30 may have dimensions (such as length and width, or diameter) of 5 mm or more, meaning that each mirror has a surface area of at least 20 mm$^2$. In the pictured embodiment, array 20 thus has an overall length of about 3 cm and a width of about 1 cm. Alternatively, the mirrors and array may be made to larger or smaller dimensions. Assuming substrate 22 to be made from two bonded wafers 50 and 52, the thicknesses of the substrate and of mirrors 26, 28 and 30 are typically no greater than 0.5 mm, and may be only a few hundred microns.

Mirrors 26, 28, 30 are suspended on torsion hinges 34, which extend collinearly along an axis 35 of rotation and connect the mirrors to substrate 22 by means of anchors 36, 38 located on opposing sides of the mirrors. Hinges 34 are etched from substrate 22 but are made sufficiently thin and flexible to twist without breaking as mirrors 26, 28 and 30 rotate on their respective hinges about axis 35. For example, hinges 34 are typically in the range of 0.4 mm to 3 mm long and have cross sectional dimensions between 0.1 and 0.9 mm. Anchors 36 are etched from substrate 22 within recess 32 between mirrors 26 and 28 and between mirrors 28 and 30. In the pictured embodiment, anchors 36 are fixed to substrate 22 indirectly, via base 24, although the anchors may alternatively be fixed directly to the surrounding substrate.

Rigid struts 40, typically with dimensions in the range of 0.1 mm to 2 mm, for example, are disposed on either side of axis 35 and connect each mirror 26, 28, 30 to the neighboring mirror or mirrors. Thus, as the mirrors rotate about axis 35, struts 40 rotate with the mirrors and maintain angular synchronization between all of the mirrors in the array.

As can be seen in FIG. 2, before bonding wafers 54 and 56 together into substrate 22, the wafers are etched to define internal cavities 58. After bonding, cavities 58 are contained within at least mirror 26, and typically within mirrors 28 and 30, as well. This mode of construction of the mirrors is useful in reducing their mass, and hence reduces the moments of inertia of the mirrors and the energy required to drive their rotation.

As shown in FIGS. 2 and 3, base 24 is etched or otherwise molded or machined to create a cavity 60, within which mirrors 26, 28 and 30 rotate. In the pictured example, cavity 60 is shallow, and the angular range of rotation of the mirrors is accordingly small. When a larger range of rotation is needed, cavity 60 may be made deeper or even opened entirely at the bottom, so that at least the edges of the mirrors can protrude through the plane of the base as they rotate.

Any suitable means that are known in the art may be applied to drive the rotation of mirrors 26, 28, 30, and the driving means are therefore omitted from the figures for the sake of simplicity. In some embodiments, magnetic rotors are coupled to the mirrors and driven by an electromagnetic drive, such as a drive of the type described in the abovementioned U.S. Pat. No. 7,952,781 or in PCT international Publication WO 2014/016794, whose disclosure is incorporated herein by reference. In other embodiments, mirrors 26, 28, 30 are driven by electrostatic or piezoelectric drives, for example. All such alternative embodiments are considered to be within the scope of the present invention.

Although array 20 comprises three mirrors of particular shapes and sizes, the principles of the present invention may be applied in producing synchronized arrays comprising only two mirrors or comprising three, four, or more mirrors, having the same or different sizes and shapes. Furthermore, these principles are applicable not only to scanning mirror arrays, but also to other sorts of moving components that are required to rotate in mutual synchronization, such as MEMS-based inertial sensors.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A scanning device, comprising a substrate, which is etched to define a recess in the substrate and to define the following structures contained in the recess:
   at least first and second mirrors, which are disposed along a common axis of rotation;
   first and second torsion hinges, which extend along the axis of rotation and connect the first mirror to the substrate on opposing sides of the first mirror so that the first mirror rotates on the first and second torsion hinges about the axis of rotation;

third and fourth torsion hinges, which extend along the axis of rotation collinearly with the first and second hinges and connect the second mirror to the substrate on opposing sides of the second mirror so that the second mirror rotates on the third and fourth torsion hinges about the axis of rotation; and rigid struts, which are disposed alongside the axis of rotation and connect the first mirror to the second mirror so that the struts rotate about the axis of rotation together with the first and second mirrors.

2. The device according to claim 1, wherein the structures comprise an anchor, which is fixed to the substrate at a location between the first and second mirrors, wherein the second and third torsion hinges connect the first and second mirrors, respectively, to the anchor.

3. The device according to claim 1, wherein the struts are sufficiently stiff to synchronize an angle of rotation of the first and second mirrors.

4. The device according to claim 1, wherein the at least first and second mirrors comprise a third mirror, and wherein the substrate is further etched to define:

fifth and sixth torsion hinges, which extend along the axis of rotation and connect the third mirror to the substrate on opposing sides of the third mirror; and further rigid struts, which are disposed alongside the axis of rotation and connect the third mirror to the second mirror, so that the third mirror and the further struts rotate about the axis of rotation together with the first and second mirrors.

5. The device according to claim 1, wherein the substrate comprises one or more semiconductor wafers.

6. The device according to claim 5, wherein the substrate comprises at least first and second semiconductor wafers, which are bonded together, wherein the first and second semiconductor wafers are etched before bonding to define internal cavities within at least the first mirror.

7. The device according to claim 5, wherein the mirrors have respective surface areas of at least 20 mm$^2$ and respective thicknesses no greater than 0.5 mm.

8. A method for producing a scanning device, comprising etching a substrate to define a recess in the substrate and to define the following structures contained in the recess:

at least first and second mirrors, which are disposed along a common axis of rotation;

first and second torsion hinges, which extend along the axis of rotation and connect the first mirror to the substrate on opposing sides of the first mirror so that the first mirror rotates on the first and second torsion hinges about the axis of rotation;

third and fourth torsion hinges, which extend along the axis of rotation collinearly with the first and second hinges and connect the second mirror to the substrate on opposing sides of the second mirror so that the second mirror rotates on the third and fourth torsion hinges about the axis of rotation; and rigid struts, which are disposed alongside the axis of rotation and connect the first mirror to the second mirror so that the struts rotate about the axis of rotation together with the first and second mirrors.

9. The method according to claim 8, wherein etching the substrate comprises fixing an anchor to the substrate at a location between the first and second mirrors, wherein the second and third torsion hinges connect the first and second mirrors, respectively, to the anchor.

10. The method according to claim 8, wherein the struts are sufficiently stiff to synchronize an angle of rotation of the first and second mirrors.

11. The method according to claim 8, wherein the at least first and second mirrors comprise a third mirror, and wherein etching the substrate comprises defining:

fifth and sixth torsion hinges, which extend along the axis of rotation and connect the third mirror to the substrate on opposing sides of the third mirror; and further rigid struts, which are disposed alongside the axis of rotation and connect the third mirror to the second mirror, so that the third mirror and the further struts rotate about the axis of rotation together with the first and second mirrors.

12. The method according to claim 8, wherein the substrate comprises one or more semiconductor wafers.

13. The method according to claim 12, and comprising bonding together at least first and second semiconductor wafers to produce the substrate, wherein the first and second semiconductor wafers are etched before bonding to define internal cavities within at least the first mirror.

14. The method according to claim 12, wherein the mirrors have respective surface areas of at least 20 mm$^2$ and respective thicknesses no greater than 0.5 mm.

\* \* \* \* \*